United States Patent
Camble et al.

(10) Patent No.: US 7,000,085 B2
(45) Date of Patent: Feb. 14, 2006

(54) SYSTEM AND METHOD FOR SECURING DRIVE ACCESS TO DATA STORAGE MEDIA BASED ON MEDIUM IDENTIFIERS

(75) Inventors: Peter Thomas Camble, Bristol (GB); Stephen Gold, Bristol (GB); Ian Peter Crighton, Bristol (GB); Curtis C. Ballard, Eaton, CO (US); Chuck Roman, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 754 days.

(21) Appl. No.: 10/034,888

(22) Filed: Dec. 28, 2001

(65) Prior Publication Data

US 2003/0126460 A1 Jul. 3, 2003

(51) Int. Cl.
*G06F 12/00* (2006.01)
*G06F 17/60* (2006.01)
*H02H 3/05* (2006.01)

(52) U.S. Cl. .................. 711/164; 711/170; 235/385; 714/7

(58) Field of Classification Search ................ 711/164, 711/170; 714/7; 235/385
See application file for complete search history.

(56) References Cited

U.S. PATENT DOCUMENTS

| | | | |
|---|---|---|---|
| 5,070,404 A * | 12/1991 | Bullock et al. ............. | 348/460 |
| 5,164,909 A | 11/1992 | Leonhardt et al. | |
| 5,303,214 A | 4/1994 | Kulakowski et al. | |
| 5,367,669 A | 11/1994 | Holland et al. | |
| 5,416,914 A | 5/1995 | Korngiebel et al. | |
| 5,442,771 A | 8/1995 | Filepp et al. | |
| 5,455,409 A * | 10/1995 | Smith et al. ................ | 235/385 |
| 5,613,154 A | 3/1997 | Burke et al. | |
| 5,734,859 A | 3/1998 | Yorimitsu et al. | |
| 5,802,278 A | 9/1998 | Isfeld et al. | |
| 5,805,864 A | 9/1998 | Carlson et al. | |
| 5,819,309 A | 10/1998 | Gray | |
| 5,835,940 A | 11/1998 | Yorimitsu et al. | |
| 5,867,335 A | 2/1999 | Ozue et al. | |
| 5,867,736 A | 2/1999 | Jantz | |
| 5,883,864 A | 3/1999 | Saliba et al. | |
| 5,890,014 A | 3/1999 | Long | |
| 5,943,688 A | 8/1999 | Fisher et al. | |
| 5,970,030 A | 10/1999 | Dimitri et al. | |
| 6,038,490 A | 3/2000 | Dimitri et al. | |
| 6,044,442 A | 3/2000 | Jesionowski | |
| 6,052,341 A | 4/2000 | Bingham et al. | |
| 6,084,736 A | 7/2000 | Kurokawa et al. | |
| 6,085,123 A | 7/2000 | Baca et al. | |

(Continued)

FOREIGN PATENT DOCUMENTS

EP 09185465 7/1997

(Continued)

OTHER PUBLICATIONS

"Sharing Backup Resources, "Ralph Cuellar; Apr. 2000.

(Continued)

*Primary Examiner*—George Davis

(57) ABSTRACT

A method for securing access to a data medium comprises listing at least one unique identifier of media that a data transfer element is allowed to access in memory storage of the data transfer element, accessing only media having at least one of the listed unique identifiers in media cartridge memory with the data transfer element, and writing a unique identifier associated with the data transfer element to the cartridge memory of the selected medium with the data transfer element in response to no library assigned unique identifier being present in the cartridge memory of the selected medium.

21 Claims, 3 Drawing Sheets

U.S. PATENT DOCUMENTS

| | | |
|---|---|---|
| 6,247,096 B1 | 6/2001 | Fisher et al. |
| 6,295,578 B1 | 9/2001 | Dimitroff et al. |
| 6,335,927 B1 | 1/2002 | Elliott et al. |
| 6,336,163 B1 | 1/2002 | Brewer et al. |
| 6,336,172 B1 | 1/2002 | Day, III et al. |
| 6,421,196 B1 * | 7/2002 | Takayama et al. ............ 360/71 |
| 6,421,711 B1 | 7/2002 | Blumenau et al. |
| 6,425,059 B1 | 7/2002 | Basham et al. |
| 6,446,141 B1 | 9/2002 | Nolan et al. |
| 6,502,162 B1 | 12/2002 | Blumenau et al. |
| 6,507,896 B1 | 1/2003 | Sanada et al. |
| 6,519,678 B1 | 2/2003 | Basham et al. |
| 6,535,964 B1 | 3/2003 | Sanada et al. |
| 6,574,667 B1 | 6/2003 | Blumenau et al. |
| 6,606,664 B1 | 8/2003 | Darago et al. |
| 6,618,796 B1 * | 9/2003 | Yamakawa et al. ......... 711/164 |
| 6,636,958 B1 | 10/2003 | Abboud et al. |
| 6,681,303 B1 | 1/2004 | Watanabe et al. |
| 6,725,394 B1 * | 4/2004 | Bolt ............................ 714/7 |
| 6,731,625 B1 | 5/2004 | Eastep et al. |
| 6,742,034 B1 | 5/2004 | Schubert et al. |
| 6,799,255 B1 | 9/2004 | Blumenau et al. |
| 6,813,698 B1 * | 11/2004 | Gallo et al. ................. 711/170 |
| 6,823,398 B1 * | 11/2004 | Lee et al. ...................... 710/5 |
| 6,832,287 B1 | 12/2004 | Beeston et al. |
| 6,842,784 B1 * | 1/2005 | Black ........................ 709/225 |
| 6,850,380 B1 | 2/2005 | Basham et al. |
| 2001/0044877 A1 | 11/2001 | Kanazawa et al. |
| 2002/0194294 A1 | 12/2002 | Blumenau et al. |

FOREIGN PATENT DOCUMENTS

| | | |
|---|---|---|
| EP | 0859308 | 8/1998 |
| EP | 10269026 | 10/1998 |
| EP | 0 978 841 | 2/2000 |
| EP | 1 039 410 | 9/2000 |
| EP | 2001014257 | 1/2001 |
| EP | 1156408 | 11/2001 |
| JP | 2002304791 | 10/2002 |

OTHER PUBLICATIONS

"The Gator Tape Library Family Architecture," John Kranz; Oct. 1999.

"Fibre Channel Fundamentals," Tom Weimer.

"Spectra 12000 User Guide," Sep. 2000.

Foreign Search Report dated Feb. 13, 2003.

IBM Technical Disclosure Bulletin, "Optical Disk Drive Loader for Work Station with Pluggable Magazine", vol. 38, No. 12, Dec. 1955, pp. 243-246.

IBM Technical Disclosure Bulletin, "Logical Grouping of Data Storage Media in a Library System", vol. 35, No. 5, Oct. 1992—pp. 17-20.

Massiglia, P., "The Raid Book", 6th edition, Feb. 1997, 83 pages.

* cited by examiner

SYSTEM AND METHOD FOR SECURING DRIVE ACCESS TO DATA STORAGE MEDIA BASED ON MEDIUM IDENTIFIERS

RELATED APPLICATIONS

The present invention is related to the following copending and commonly assigned United States patent applications: System and Method for Partitioning a Storage Area Network Associated Data Library, filed Dec. 28, 2001 and issued as U.S. Pat. No. 6,715,031; System and Method for Partitioning A Storage Area Network Associated Data Library Employing Element Addresses, filed Dec. 28, 2001 and issued as U.S. Pat. No. 6,839,824; Ser. No. 10/032,662, entitled System and Method for Managing Access to Multiple Devices in a Partitioned Data Library, filed Dec. 28, 2001; Ser. No. 10/032,923, entitled System and Method for Peripheral Device Virtual Functionality Overlay, filed Dec. 28, 2001; Ser. No. 10/034,518, entitled System and Method for Securing Drive Access to Media Based On Medium Identification Numbers, filed Dec. 28, 2001; Ser. No. 10/033,010, entitled System and Method for Securing Fiber Channel Drive Access in a Partitioned Data Library, filed Dec. 28, 2001; Ser. No. 10/033,003, entitled Method for Using Partitioning to Provide Capacity on Demand in Data Libraries, filed Dec. 28, 2001; System and Method for Intermediating Communication with a Moveable Media Library Utilizing a Plurality of Partitions, filed Dec. 28, 2001 and issued as U.S. Pat. No. 6,845,431; and Ser. No. 10/034,083, entitled System and Method for Managing a Moveable Media Library with Library Partitions, filed Dec. 28, 2001; the disclosures of which are hereby incorporated herein by reference.

TECHNICAL FIELD

The present invention generally relates to data storage and specifically to systems and methods for securing drive access to media based on medium identifiers.

BACKGROUND

One of the most attractive aspects of a storage area network (SAN) is that network connectivity enables a company to efficiently use storage by sharing storage capacity among a number of servers. This may be implemented using a large number of small capacity storage devices. However, unless sufficiently robust management software is employed, such use of small capacity devices in a SAN may result in significant management overhead. Most users prefer to install large capacity storage devices and partition the device(s), assigning each partition to a different server. For example, existing firmware for enterprise level disk arrays allow users to define multiple redundant arrays of independent disks (RAID), where each RAID set appears as a different logical unit number (LUN). Each one of these LUNs may be dedicated to a different server.

In certain SAN usage scenarios, such as may arise for storage service providers (SSPs), there are multiple customers attempting to share common SAN resources. In such cases, there is a need to ensure that customers can only see and access the storage resources they have been allocated and prevent them from accessing storage of other customers. For example, if a customer stores their critical business data with a SSP, then they generally do not want other customers of the SSP reading their data or even being aware that the customer has information stored with the SSP. To isolate user data in a data library the library may be partitioned. However, special hardware or special backup software as described below has been used to implement partitioning.

Existing software-based data library partitioning solutions typically employ a host system that restricts access to portions of a tape library. The host restrictions are implemented by a mediating (software) process on a host system to enforce partition restrictions. However, this approach is problematic. Specifically, the approach is undesirable if the data library is utilized in a SSP environment. In SSP environments, the data library and the host systems belong to different entities (e.g., the SSP and the customers). Placement of software mediating processes on host systems is unattractive, because it increases the burden on the customers to make use of the storage service. Moreover, many customers are unwilling to allow other parties to place software on their host systems. Additionally, the software mediating process approach is typically incompatible with existing data back-up utilities, i.e., the software mediating process approach requires the use of specialized data back-up applications. Hence, users are effectively denied the ability to run desired backup software.

An additional problem may arise in that a library operator may accidentally place a medium in an incorrect storage slot within a partitioned data library or in an entirely incorrect data library within an SSP's facility. This may allow this misplaced medium to be read by an SSP customer or user other than the owner of the information on the misplaced medium.

The use of memory in a tape cartridge, generally referred to as cartridge memory (CM), is known in the art. Existing cartridges and drives store information in the CM such as how many times a tape has been loaded, a cassette serial number, what was last written on the tape, what block was last written to on the tape and/or the tape error rate. Conventionally this information facilitates setting up the tape when it is inserted back into a drive. For example, each time a tape cartridge with CM is inserted into a drive the CM is read during initialization of the drive. During the drive initialization sequence, the drive reads the memory, diagnoses the tape, recognizes the tape format and where writing should begin. Additionally, information in the memory about error rate and/or number of loads can help diagnose failing tapes. Such CM may also be referred to as memory in cartridge (MIC).

SUMMARY OF THE INVENTION

A method for securing access to a data medium comprises listing at least one unique identifier of media that a data transfer element is allowed to access in memory storage of the data transfer element, accessing only media having at least one of the listed unique identifiers in media cartridge memory with the data transfer element, and writing a unique identifier associated with the data transfer element to the cartridge memory of the selected medium with the data transfer element in response to no library assigned unique identifier being present in the cartridge memory of the selected medium.

A method embodiment for securing access to data media in a particular partition of a partitioned data library comprises listing at least one unique identifier of media that data transfer elements in the partition are allowed to access in memory storage of the data transfer elements in the partition, reading a unique identifier from cartridge memory of a selected medium with a data transfer element receiving the selected medium, checking the memory storage of the data transfer element receiving the selected medium for the unique identifier of the selected medium, and accessing the selected medium in response to the unique identifier of the selected medium being present in the memory storage of the data transfer element receiving the selected medium.

An embodiment of a partitioned data library in accordance with a preferred embodiment of the present invention comprises data storage media, each medium of the media having cartridge memory, a plurality of storage element slots, each of the slots adapted to store one medium of the data storage media, at least one set of at least one of the slots assigned to one partition of a plurality of library partitions, a plurality of data transfer elements that are adapted to receive the media, read the medium cartridge memory and transfer data to and from the media, each of at least one set of at least one of the data transfer elements assigned to one of the library partitions, and wherein the cartridge memory of a selected medium is read by one of the data transfer elements receiving the selected medium and access to the media by the data transfer elements is restricted to selected media having at least one particular unique identifier stored in the medium cartridge memory.

DETAILED DESCRIPTION

The present invention is directed to systems and methods that provide medium access security based on a unique identifier written to a medium cartridge memory (CM). Preferably, the unique identifier is written to CM by a drive and is read by a drive. The present system and method moves ultimate responsibility for limiting access to certain media in a partitioned data library to the drives, providing a failsafe for a library partitioning system.

Figure 1:
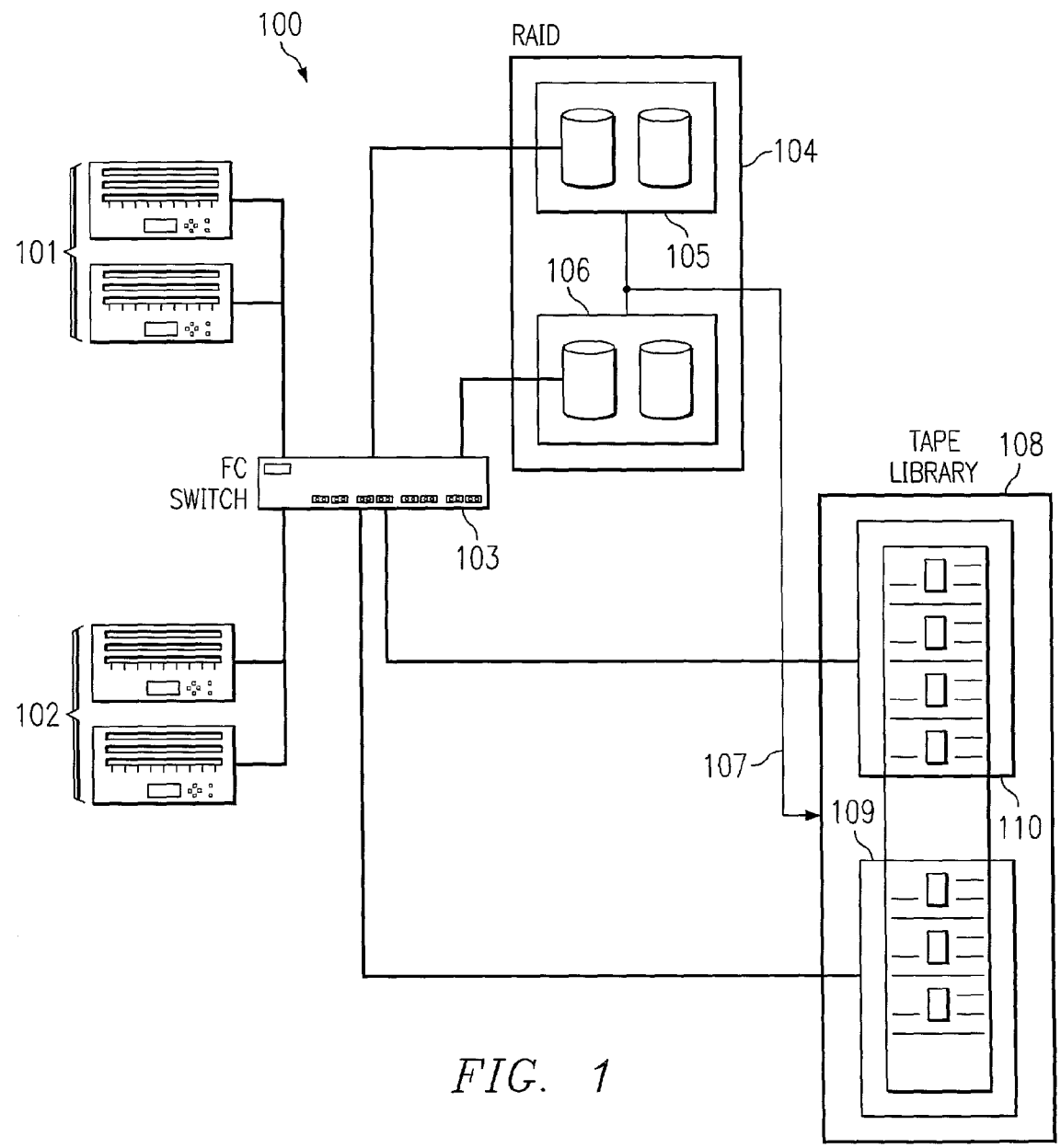
FIG. 1 is a diagrammatic illustration of a SAN operating consistent with the teachings of the present invention.

Turning to FIG. 1, SAN 100 is shown. By way of example, first and second customer servers 101 and 102 are connected to SAN 100 via FC switch 103. RAID 104 may be partitioned, assigning first partition 105 to server 101 and second partition 106 to server 102 using existing LUN-based RAID partitioning methods. Zero downtime backups (ZDBs) may be performed of the data each server has on the RAID to data library 108, via ZDB interconnectivity 107 between RAID 104 and data library 108. Such ZDBs preferably employ data-mover firmware embodied in RAID 104 or other elements of SAN 100. ZDBs are preferably carried out without impinging on the processor operations or LAN capacity of servers 101 and 102. Data library 108 may be partitioned in such a manner as to insure that data for server 101 is maintained in partition 109 separate from data for server 102, and that the data of server 102 is maintained in partition 110 separate from data for server 101. Such partitioning facilitates restricting access such that the servers may not access each other's data even though both servers' data is maintained in the same physical library.

A SAN attached data library may be logically partitioned into many smaller libraries without the use of special hardware or software. Each of the drives in the library may be designated for use by a different host system that has free access to the library robotics controller as well as to the designated drives. Such a system and method is disclosed in U.S. Pat. No. 6,715,031, "System and Method For Partitioning a Storage Area Network Associated Data Library." A set of drives and medium storage slots of the library are assigned to each partition. The movement of media is restricted to and from slots and drives within a partition. The drives in the library are preferably assigned a limited range of media that each drive may access for read/write functions.

Figure 2:
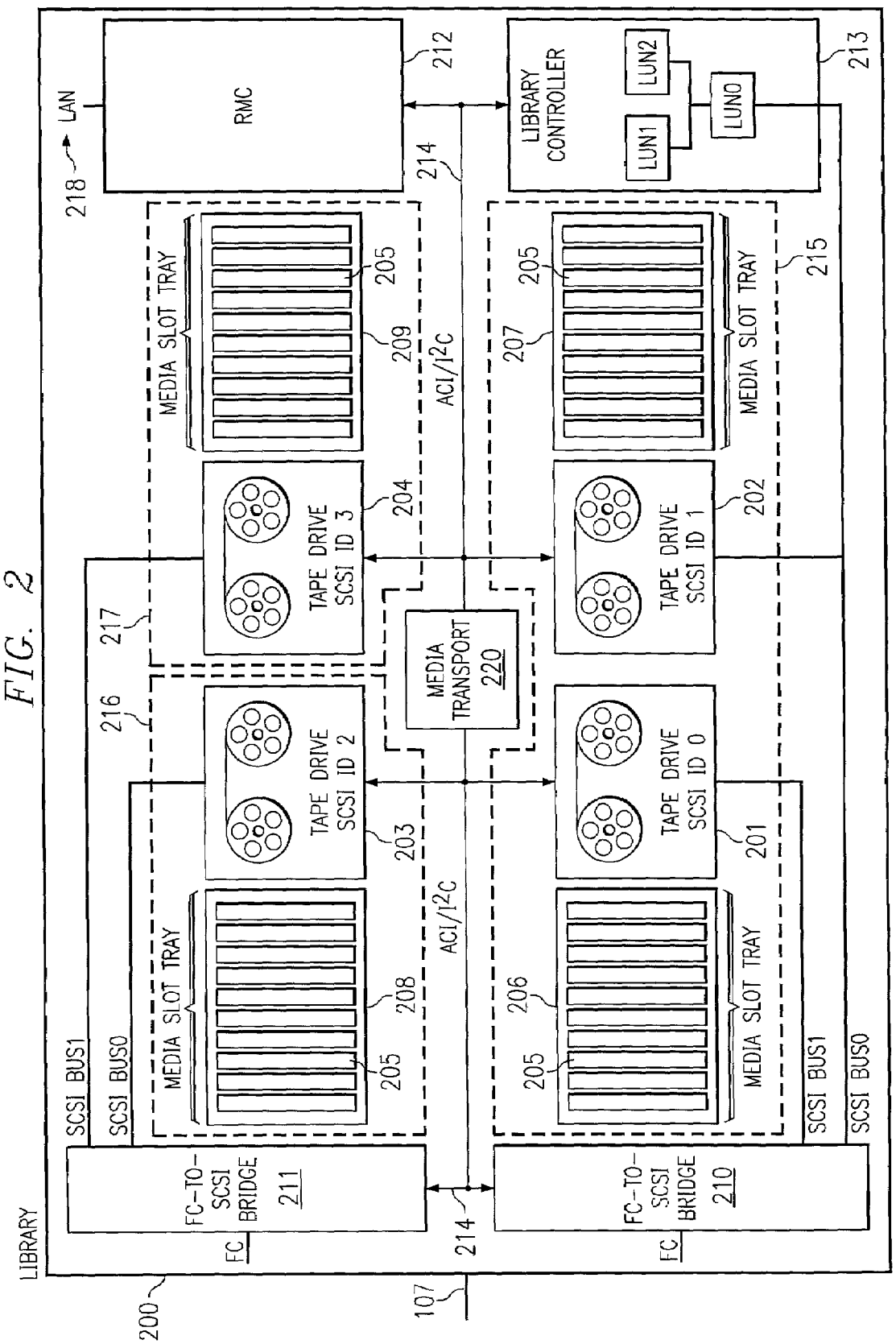
FIG. 2 is a diagrammatic illustration of an example of a data library employing a preferred embodiment of the present invention.

Data tape library 200 employing a preferred embodiment of the present system and method is illustrated in FIG. 2 as an example of a library that may be employed as library 108 of FIG. 1. However, other library designs and/or capacities may embody the present system and method. Exemplar data tape library 200 has four CM-enabled drives or data transfer elements 201–204; forty media storage element slots 205 organized into four trays 206–209 of ten slots 205 each; two FC-to-SCSI bridges 210 and 211; a library management interface card or remote management card (RMC) 212; and library controller 213. Drives 201–204, FC-to-SCSI bridges 210 and 211, RMC 212 and library controller 213 preferably communicate with each other using an inter-integrated circuit ($I^2C$) bus, illustrated here as automated control interface (ACI) 214, or the like.

For partitions that may employ the present system and method, library, drives 201–204 should be assigned to each partition. Drives 201–204 are preferably enabled to read CM, thereby allowing a drive to read a unique identifier residing in CM of a medium disposed in the drive. Additionally, media slots 205 may also be assigned to each partition to house the media assigned to the partition. A virtual library controller should be addressable with respect to each partition to control movement of media between the slots and drives by library robotics 220. The example partitioning shown in FIG. 2 is indicated by boxes 215, 216 and 217. As illustrated, LUN0 corresponds to partition 215, LUN1 corresponds to partition 216 and LUN2 corresponds to partition 217. Finally, import/export elements or mailslots may be assigned to each partition or configured for use by the entire physical library. Preferably, easily-accessible media storage slots may be configured as mailslots by the present invention.

CM-enabled tape drives 201 through 204 may be configured out-of-band, via ACI 214 so that the drives will write a specified, relatively unique, identifier to tape CM the first time a tape is inserted into the drive. This unique identifier in the CM preferably identifies the media as having been written to by a drive or the set of drives in a virtual library partition. All drives in a partition may employ the same unique identifier; in turn, the media in the partition would have the same unique identifier residing in CM. The identifier may only be unique within the library itself, such as to provide differentiation between media of partitions of the library. Thus, it should be appreciated that the unique identifier might not differentiate media between partitions of different physical libraries. Preferably, the unique identifier is unique to a degree sufficient to differentiate media within a physical entity, such as a SAN or within an SSP's resources and would provide an indication as to the physical library, partition and/or drive to which a medium belonged. Alternatively, a unique identifier may be universally unique.

Preferably, no special initialization or inventory sequence is required to setup security employing the present system and method beyond configuring a drive to only accept media which have the aforementioned unique identifier(s) in their CM. This drive setup may be performed via an RMC user interface. The RMC and/or controller may direct a drive to only allow access to media having a particular identifier in CM. These directions are preferably conveyed via ACI 214 and stored in nonvolatile random access memory (NVRAM) associated with the drive in the form of a list of unique media identifiers the drive is allowed to access. Preferably, media with no identifier present in CM may also be accepted, at which point an identifier associated with the receiving drive and/or the drive's partition is preferably written to the CM of the medium. Thusly, a new medium introduced into a partition may be secured by the present inventive system and method.

Figure 3:
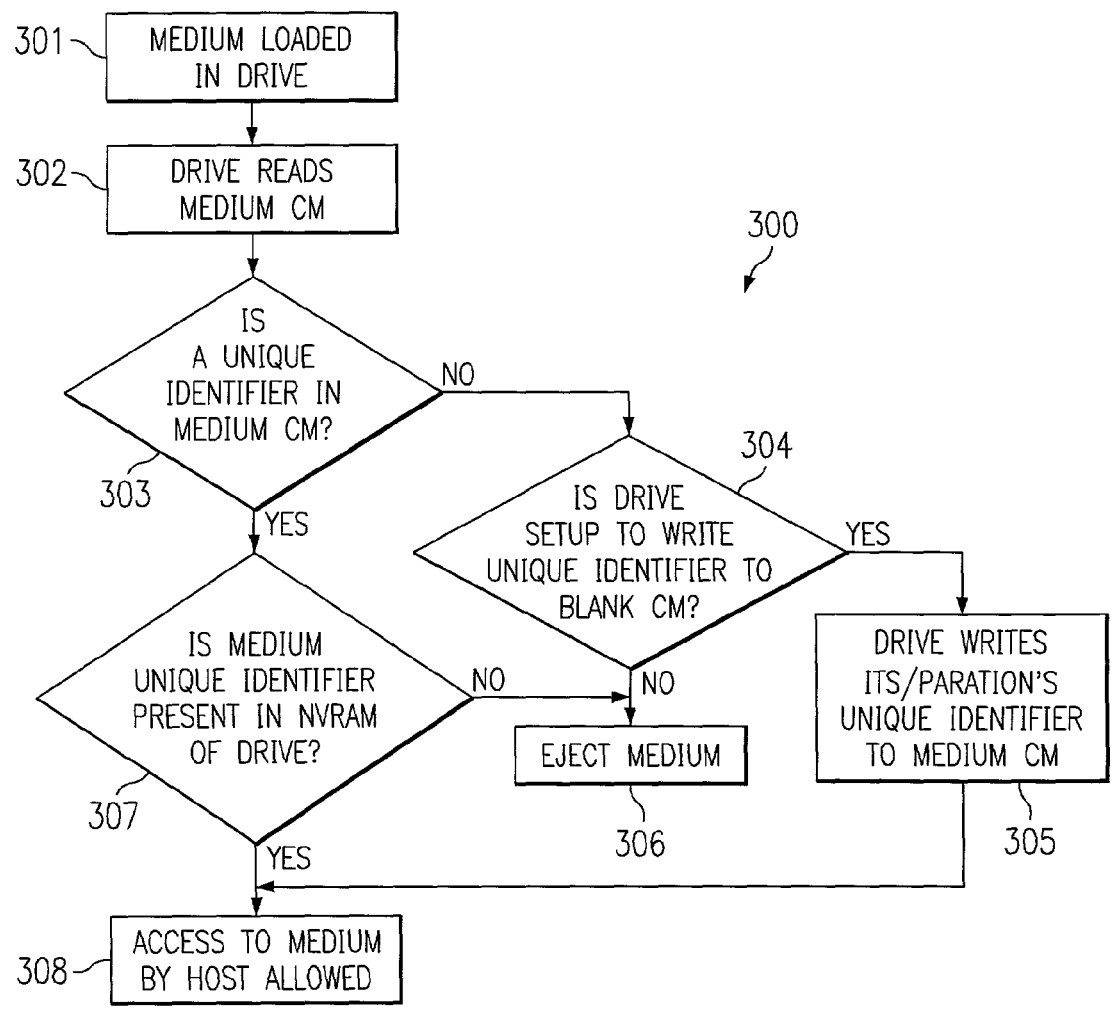
FIG. 3 is a flow chart of operation of a preferred method according to a preferred embodiment.

Turning to FIG. 3, a preferred embodiment of the present method 300 may be used to move responsibility for limiting access to certain media down to the drive and medium level. A medium may be loaded into a drive by the library at box 301. At box 302 the CM enabled drive reads the CM of the medium and confirms, at 303, the presence of a unique identifier in the CM. Preferably the unique identifier will identify the media as having been written to by that drive, or one of a set of drives in that drive's virtual library partition. If no library assigned unique identifier is present at 303 then the drive may write its unique identifier, which identifies the medium as belonging to the drive's partition, to the CM of the medium at box 305; and the medium is accessed at box 308. Preferably, if a medium has no identifier in CM the medium is blank, having never had data written to it. This insures that a medium can only be used in a particular partition from the time a unique identifier is written to the medium's CM, forward. If a unique identifier is present at step 303 then the drive firmware checks to see whether the unique identifier of the medium is present in the NVRAM of the drive at box 307. If at 307 the unique identifier is in the NVRAM, then the drive recognizes that medium as belonging to the same partition as the drive, and allows the connected host system to have unhindered read/write access to the medium at box 308. However, if the drive finds a unique identifier in the CM at 307 that identifies the medium as belonging to another partition or that the drive does not recognize, the drive will preferably immediately eject the medium at box 306 and thus denying the accessing host access to the medium.

A method, in accordance with the present invention, replaces a unique identifier in a medium CM with another, different, unique identifier. Such a unique identifier swap-out may be desirable to facilitate movement of media from one physical library to another, such as may take place in a library upgrade. In such a swap-out, the partition the medium is placed in belongs to the same customer as the medium's original partition but the identifier in the new library is different due to the new library having a different set of physical drives. Additionally, "used" tapes introduced into a library will preferably have any unique identifier residing in CM replaced, in accordance with this method. This method is preferably preformed as part of an import procedure for the medium into the library and preformed out-of-band via the RMC and/or controller, with instructions to the drive(s) being issued over the ACI. A medium with a unique identifier residing in CM is added to a library via an import/export slot. Preferably using a RMC user interface or the front panel of the library, the imported medium is moved from the import/export slot to a storage element slot in a library partition. In the case of a swap-out, the partition would preferably be one secured for use by a same customer as a partition from which the medium was exported in another library. Then the robotics of the library are directed, via the front panel or RMC interface, to place the medium in a drive of the partition. The old unique identifier in CM is overwritten by the new drive with a unique identifier associated with the drive and/or the partition. Preferably, positive confirmation via the front panel or RMC interface is required to overwrite the unique identifier to insure partition integrity. If this positive confirmation is not provided the medium is preferably ejected. This method is preferably carried out manually, as a automatic process would allow one to defeat partition security.

Preferably, the drive firmware enforces access control, and preferably the firmware or NVRAM contents cannot be changed by the end user. So even if the user has unrestricted access to both the drives and library robotics at the command level, the user cannot defeat the access controls. Specifically, the identifier checking mode of a drive preferably may not be altered in band, such as by a SCSI command. Such an alteration is preferably only allowed to be carried out out-of-band, over the ACI. This out-of band alteration preferably may only be made over a LAN connected to the RMC, which in turn communicates over on an $I^2C$ to the library controller or via the library front panel. As indicated above, the controller communicates with the drives over an ACI. This isolation of control and security facilitates use of conventional, unmodified backup application software by a user rather than a software dictated by a SSP.

What is claimed is:

1. A method for securing access to a data medium comprising:
   listing at least one unique identifier of media that a data transfer element is allowed to access in memory storage of said data transfer element;
   accessing only media having at least one of said listed unique identifiers in media cartridge memory with said data transfer element; and
   writing a unique identifier associated with said data transfer element to said cartridge memory of a selected medium with said data transfer element in response to no library assigned unique identifier being present in said cartridge memory of said selected medium.

2. The method of claim 1 further comprising:
   reading a unique identifier from cartridge memory of a selected medium with said data transfer element; and
   checking said memory storage of said data transfer element for said unique identifier from said selected medium cartridge memory.

3. The method of claim 1 further comprising:
   detecting presence of said unique identifiers in said cartridge memory of a selected medium.

4. The method of claim 1 wherein said writing step further comprises:
   accessing said selected medium.

5. The method of claim 1 wherein said accessing step further comprises:
   ejecting a selected medium in response to absence of said unique identifier of said selected medium in said memory storage of said data transfer element.

6. The method of claim 1 wherein said data transfer element and said media that said data transfer element is allowed to access are part of a data library partition.

7. The method of claim 1 further comprising:
   overwriting an existing unique identifier in cartridge memory of a selected media with one of said listed unique identifiers associated with said data transfer element.

8. The method of claim 1 wherein at least one of said media are selected from a group of media consisting of:

media previously assigned a unique identifier,
new blank media, media erroneously placed in said data transfer element, and
imported media.

9. A method for securing access to data media in a particular partition of a partitioned data library, said method comprising:
listing at least one unique identifier of media that data transfer elements in said partition are allowed to access in memory storage of said data transfer elements in said partition;
reading a unique identifier from cartridge memory of a selected medium with a data transfer element receiving said selected medium;
checking said memory storage of said data transfer element receiving said selected medium for said unique identifier of said selected medium; and
accessing said selected medium in response to said unique identifier of said selected medium being present in said memory storage of said data transfer element receiving said selected medium.

10. The method of claim 9 further comprising:
ejecting said selected medium in response to an absence of said unique identifier of said selected medium in said memory storage of said data transfer element receiving said selected medium.

11. The method of claim 9 further comprising writing a unique identifier associated with said partition to said cartridge memory of said selected media, in response to no library assigned unique identifier being present in said cartridge memory of said selected medium.

12. The method of claim 11 wherein said writing step further comprises:
accessing said selected medium.

13. The method of claim 11 further comprising:
overwriting an existing unique identifier in cartridge memory of said selected media with one of said listed unique identifiers associated with said partition.

14. The method of claim 9 wherein said reading step further comprises detecting presence of any unique identifiers in said cartridge memory of said selected medium.

15. The method of claim 9 wherein at least one of said media are selected from a group of media consisting of: media previously assigned a unique identifier, new blank media, media erroneously placed in said particular partition, media imported into said library, and media imported into said particular partition.

16. A partitioned data library comprising:
data storage media, each medium of said media having cartridge memory;
a plurality of storage element slots, each of said slots adapted to store one medium of said data storage media, at least one set of at least one of said slots assigned to one partition of a plurality of library partitions; and
a plurality of data transfer elements that are adapted to receive said media, read said medium cartridge memory and transfer data to and from said media, each of at least one set of at least one of said data transfer elements assigned to one of said library partitions, wherein said cartridge memory of a selected medium is read by one of said data transfer elements receiving said selected medium and access to said media by said data transfer elements is restricted to selected media having at least one particular unique identifier stored in said medium cartridge memory.

17. The library of claim 16 further comprising:
a library controller directing movement of said media to and from one of said set of slots to and from one of said sets of data transfer elements assigned to a same of said partitions.

18. The library of claim 16 wherein each of said data transfer elements comprise memory storage storing a list of at least one unique media identifiers that data transfer elements in a particular data transfer element's partition are allowed to access.

19. The library of claim 16 wherein a selected medium is ejected from a data transfer element receiving said selected medium in response to said unique identifier in cartridge memory of said selected medium not being one of said at least one particular unique identifier.

20. The library of claim 16 wherein a data transfer element receiving a selected medium without a unique identifier in medium cartridge memory writes a unique identifier associated with a partition of said data transfer element receiving said selected medium to cartridge memory of said selected medium.

21. The method of claim 16 wherein at least one of said media are selected from a group of media consisting of: media previously assigned a unique identifier, new blank media, media erroneously placed in a partition, media imported into said library, and media imported into a partition.

* * * * *